United States Patent [19]
Venkateswar

[11] Patent Number: 5,786,843
[45] Date of Patent: Jul. 28, 1998

[54] TWO-DIMENSIONAL MODULATION FOR LINE SCREEN PRINTING

[76] Inventor: Vadlamannati Venkateswar, 2705 Cobre Valle La., Plano, Tex. 75023

[21] Appl. No.: 721,880

[22] Filed: Sep. 27, 1996

Related U.S. Application Data

[60] Provisional application No. 60/004,414 Sep. 27, 1995.
[51] Int. Cl.$^6$ ...................................................... H04N 1/40
[52] U.S. Cl. .......................... 347/251; 358/455; 358/467; 358/536; 399/180
[58] Field of Search .................................. 347/239, 251; 358/248, 455, 456, 458, 467, 536; 382/260; 399/180, 181

[56] References Cited

U.S. PATENT DOCUMENTS 5,654,808  8/1997  Herregods et al. ...................... 358/456

OTHER PUBLICATIONS

Miller, Rodney, et al., *Human Vision Visual Processing and Digital Display IV*, SPIE, vol. 1913, 1993, pp. 367–377.

*Primary Examiner*—N. Le
*Assistant Examiner*—Hai C. Pham
*Attorney, Agent, or Firm*—Julie L. Reed; James C. Kesterson; Richard L. Donaldson

[57] ABSTRACT

An improved method of line screen printing. Instead of screening the image with only one set of lines, the image is also screened with a second set of lines, which are substantially orthogonal to those of the first set. (FIG. 3). The screening is accomplished with two types of cells, horizonal cells and vertical cells. The pixels are classified according to their distance from the nearest line in the horizontal cells. This process is repeated with respect to the vertical cells. (FIG. 5). Different tone curves, which map input pixel values to output pixel values, are associated with different pixel classifications. In general, pixels closer to lines have tone curves that map to higher output values. (FIGS. 6 and 7). Because each pixel is in both a horizontal cell and a vertical cell, each pixel has two values from the tone curves. For each pixel, its two tone curve values are combined to obtain a greyscale value for that pixel.

11 Claims, 3 Drawing Sheets

TWO-DIMENSIONAL MODULATION FOR LINE SCREEN PRINTING

This application claims priority under 35 U.S.C. § 119 (e) (1) of provisional application No. 60/004,414, filed Sep. 27, 1995.

TECHNICAL FIELD OF THE INVENTION

This invention relates generally to digital printing systems, and more particularly, to a method of providing greyscale values for use by the printing system.

BACKGROUND OF THE INVENTION

Existing electrophotographic printer technologies make use of a photoconductive drum. Depending on the type of photoconductor used, the drum is either charged or discharged to attract toner, with the charging or discharging accomplished by reflecting light onto the drum. The drum then transfers the toner to the paper or other surface to be printed upon.

To expose the drum, a light modulator or other imaging device may be used. Typically, the imaging device has an array of pixels as wide as the printed image. These pixels are addressed with data, which indicates the exposure for each pixel. The drum rotates so that one line of the drum is exposed by a line of pixels during each line period.

To some extent, gray scaling can be done by varying the exposure at points on the drum to control the amount of toner on any point. One way to vary the exposure is to re-expose the same line of the drum by successive lines of pixels. As the drum rotates, overlapping exposures are accumulated on it. Each line is re-exposed for as many times as is desired for a given greyscale capability. This approach to providing greyscale is referred to as "multi-level" printing. Its main limitation is that it permits only a limited number of levels of gray.

Halftone printing is another approach to providing greyscale. In general, halftone printing takes advantage of the ability of the human eye to integrate over an area. The image is divided into "cells", each non-white cell to be printed with a dot. For each unit of area, the dot size is adjusted according to the intensity of that unit. A feature of half-tone printing is the use of a line screen so that the dots are printed along diagonal lines. This screening facilitates the eye's ability to integrate the dots into a smooth image.

Halftone concepts have been used with electrophotographic printing to provide better quality images. If the image is screened into diagonal lines and exposures are concentrated along them, there is less noise, especially in low intensity levels.

SUMMARY OF THE INVENTION

One aspect of the invention is a method of generating greyscale values for printing an image, where the image is represented by pixels having input pixel values. The image is "screened" with a number of lines in one direction and a number of lines in a substantially orthogonal direction. This screening is accomplished by twice dividing the image into cells, once horizontally and once vertically. The horizontal cells each contain the same number of the pixels and have a repeating pattern of a portion of one or more of the lines in one direction. Similarly, the vertical cells each containing the same number of the pixels to be printed but have a repeating pattern of a portion of one or more of the lines in the substantially orthogonal direction. For each horizontal cell, each pixel in that cell is classified in accordance with its distance from the nearest line of that cell. Also, for each horizontal cell, each pixel's input greyscale value is mapped to a horizontal greyscale value, with the mapping being a function of the pixel's classification in that cell. The process is repeated for each vertical cell. This results in two output values for each pixel of the image, which are combined to determine a final greyscale value for each pixel.

An advantage of the invention is that it permits better rendition of greyscale levels. On an electrophotographic printer, the exposures are concentrated at the intersections of the lines of the line screen. This concentration of exposures is in a smaller area than when the line screen has only one set of lines. As a result, the electric fields are concentrated and can attract toner particles with less ambiguity.

DETAILED DESCRIPTION OF THE INVENTION

The method described herein is in terms of use with an electrophotographic printer, specifically a printer having a photoconductive drum that is exposed by light from a spatial light modulator. However, the invention is also useful with electrophotographic printers with other exposure devices. Furthermore, the printer need not be electrophotographic, and can be any printer that provides greyscale images from digital data. In general, the invention is directed to a method of providing greyscale values that can be used by the printer to print greyscale images.

Figure 1:
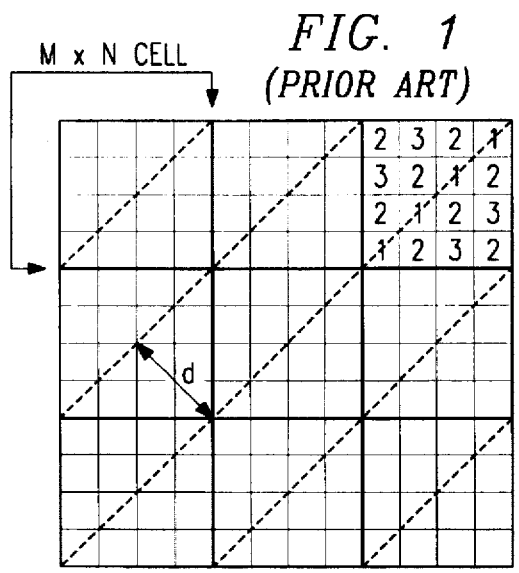
FIG. 1 illustrates a screening pattern for conventional halftone printing.

FIG. 1 illustrates a "screening pattern" for conventional line-screen printing. The image is screened with lines along which pixel exposures are to be clustered. The lines are typically diagonal with respect to the image, to facilitate the ability of the eye to integrate the printed pattern. The line screening is accomplished by dividing the image into cells of size m×n. Within each cell are one or more lines. The cells are in a repeating pattern—each cell is the same size and each has its line in the same location. When the cells are tiled together, the lines merge seamlessly, creating the effect of a line screen. The cells facilitate computation, in that the process for each cell is computationally the same, with different pixel values.

In the example of FIG. 1, each cell has 4×4=16 pixels, and has one line associated with it. The slant angle of the lines is 45 degrees, relative to the orientation of the printed image. The distance, d, between lines is 2√2. Many other screening patterns are possible. The cells may be any m×n rectangle and the lines may have other diagonal slant angles. Also, each cell could contain more than one line. The primary characteristic of the line screening is that there is a repeating pattern among the cells.

FIG. 1 also illustrates, in one cell, a classification of pixels based on distance from the nearest line. In this example, the cell has three classes, with class 1 denoting the pixels having the least distance. Each cell has its pixels classified in this manner.

Figure 2:
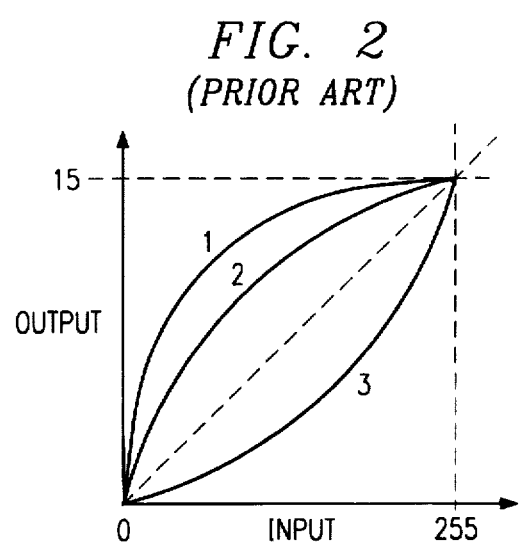
FIG. 2 is an example of tone curves for the screening pattern of FIG. 1.

FIG. 2 is a set of tone curves for the line screening pattern of FIG. 1. Each class of pixel has an associated tone curve. The tone curves are designated 1-3 to correspond to the classes of pixels. Each tone curve maps a given input pixel value to a given output pixel value. In the example of FIG. 2, the input values are 8-bit values and the output values are 4-bit values, but the input and output values could have any bit resolution. For each pixel, the tone curve used for mapping its input value to its output value is determined by that pixel's classification. In general, for a given input value, a class 1 pixel would have a higher output value than a class 2 or class 3 pixel.

The tone curves ensure that exposures are clustered in the area of the lines of the screen. In general, the tone curves may be arbitrarily defined. But the motivation is to generate high contrast modulation around the lines. The tone curves of FIG. 2 have this effect, in that for a given input greyscale value, pixels closer to lines have higher output values.

A feature of the invention is the recognition that line screening can be performed in more than one direction. The screening pattern of FIG. 1 is "one dimensional" in the sense that it has lines in only one direction. As explained below, higher quality images can be produced by using "two-dimensional" screening.

Figure 3:
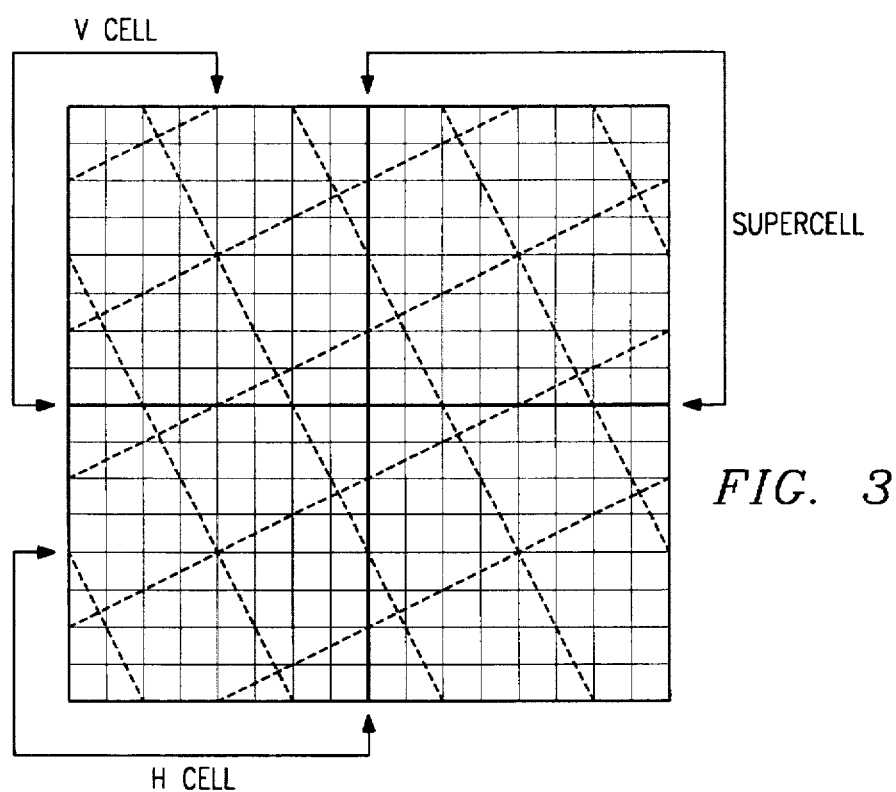
FIG. 3 illustrates a screening pattern for two-dimensional halftone printing in accordance with the invention.

FIG. 3 illustrates an example of two dimensional screening in accordance with the invention. In comparison to the screening of FIG. 1, the image is screened into two sets of lines, one set substantially orthogonal to the other. The image is also divided into "supercells". Each supercell contains an integer number of horizontal (H) cells and an integer number of vertical (V) cells.

In the example of FIG. 3, each supercell is 8×8 pixels. Within each supercell there are two horizontal cells and two vertical cells. Each horizontal cell is 8 pixels wide and 4 pixels high, and each vertical cell is 4 pixels wide and 8 pixels high. The horizontal and vertical cells are the same size, but rotated 90 degrees.

Figure 4:
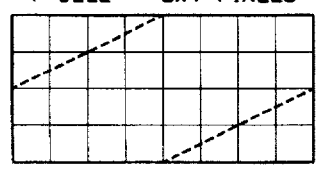
FIG. 4 illustrates a single horizontal cell of the pattern of FIG. 3.

FIG. 4 illustrates a single horizontal cell of the pattern of FIG. 3. Each cell contains two lines from one of the line sets. Each vertical cell has an identical pattern, rotated 90 degrees.

In other embodiments, the horizontal cells and vertical cells need not be the same shape. Furthermore, in other embodiments, the cells could have only one associated line or could have more than two lines. It is not necessary that the horizontal cells have the same number of lines as the vertical cells. However, each horizontal cell should have a repeating pattern with other horizontal cells, and each vertical cell should have a repeating pattern with other vertical cells.

Figure 5:
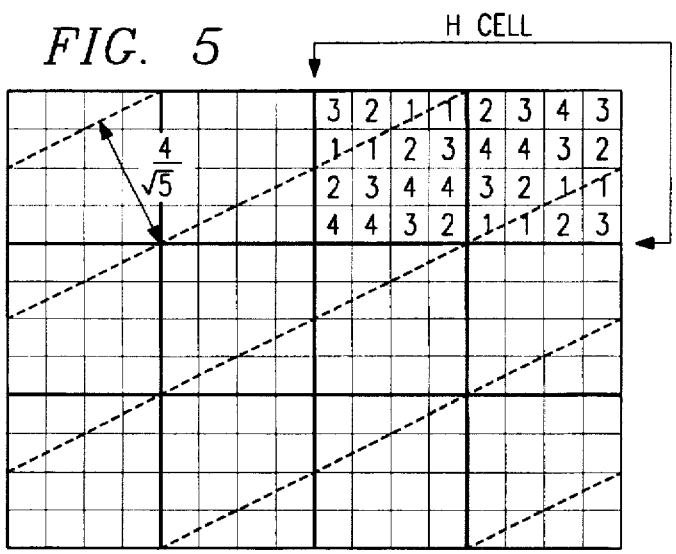
FIG. 5 illustrates the interline distance and pixel classifications for the horizontal cells of FIG. 3.

FIG. 5 illustrates the line distance and pixel classifications for the horizontal cells of FIG. 3. The line distance is 4/√5. There are four classes of pixels, which like the classes of FIG. 1, vary depending on a pixel's distance from the nearest line. In the example of this description, where the cells are of equal size and the two sets of lines have equal spacing, the vertical cells would have the same line distance and could have the same classes as the horizontal cells. Because each pixel belong to both a horizontal cell with one set of lines and to a vertical cell with another set of lines, each pixel has two classifications.

Figure 6:
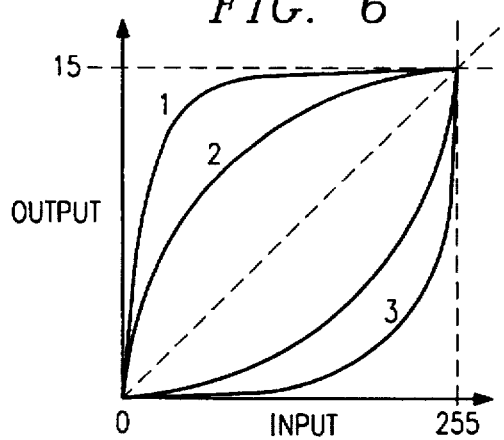
FIGS. 6 and 7 illustrate tone curves for the screening pattern of FIG. 3.
Figure 7:
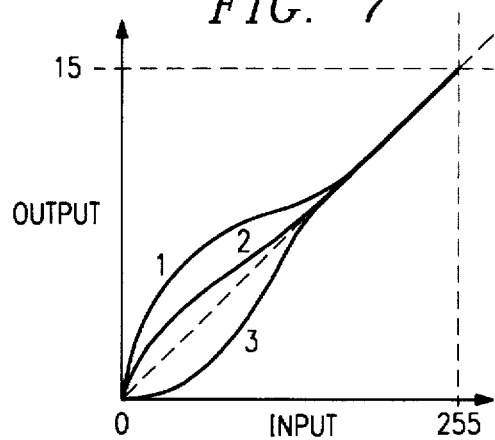

FIGS. 6 and 7 illustrate the tone curves for the two-dimensional screening pattern of FIG. 3. There are two sets of tone curves—FIG. 6 is a set of tone curves for the horizontal cells and FIG. 7 is a set of tone curves for the vertical cells. Although FIG. 6 and 7 illustrate different tone curves being used for horizontal cells and vertical cells, the same tone curves could be used for both types of cells. Like the tone curve of FIG. 2, the input pixel values are 8-bit values and the output values are 4-bit values, but any bit resolution could be used for input or output.

To implement the method of the invention, the image is screened in two dimensions, horizontally and vertically, and the tone curves are specified. Then, the input pixel values are processed, pixel by pixel. Each pixel is assigned a classification from its horizontal cell, which is used to map the pixel's input value to a first output value. Then, the pixel is assigned a classification from its vertical cell, which is used to map the pixel's input value to a second output value. These two values are combined to provide the pixel's output greyscale value. Typically, the two values are combined by being multiplied, but they could be combined in some other manner, such as by averaging.

Suppose an image is represented by m-bit pixel values, and is screened into horizontal and vertical cells. For each pixel, its m-bit pixel value is first mapped to a first n-bit output value, using the pixel's classification with respect to the horizontal cells and the tone curves for the horizontal cells. Because of the tone curves, pixels closer to lines in the horizontal cells would have higher output values than other pixels with the same input value. The process is repeated for the vertical cells. Each pixel's two n-bit output values, one from each set of tone curves, are combined to obtain an greyscale value for that pixel. For multi-level electrophotographic printing, each point on the drum is exposed or not exposed for an appropriate number of times, in accordance with the greyscale data.

Figure 8:
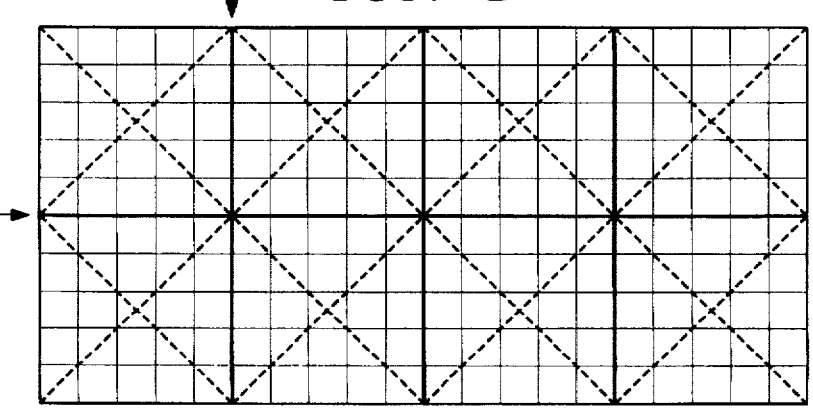
FIGS. 8 and 9 illustrate alternative screening patterns in accordance with the invention.

FIG. 8 illustrates another two-dimensional screening pattern in accordance with the invention. As in FIG. 3, the image is screened into one set of lines in one direction and another set of lines in a substantially orthogonal direction. However, unlike the screening pattern of FIG. 3, the boundaries of the cells in FIG. 8 are contiguous. In other words, the horizontal cells and the vertical cells are the same. Nevertheless, the classification of the pixels in the cells will be different for vertical cells and horizontal cells because vertical cells contain a different set of lines than the horizontal cells.

Figure 9:
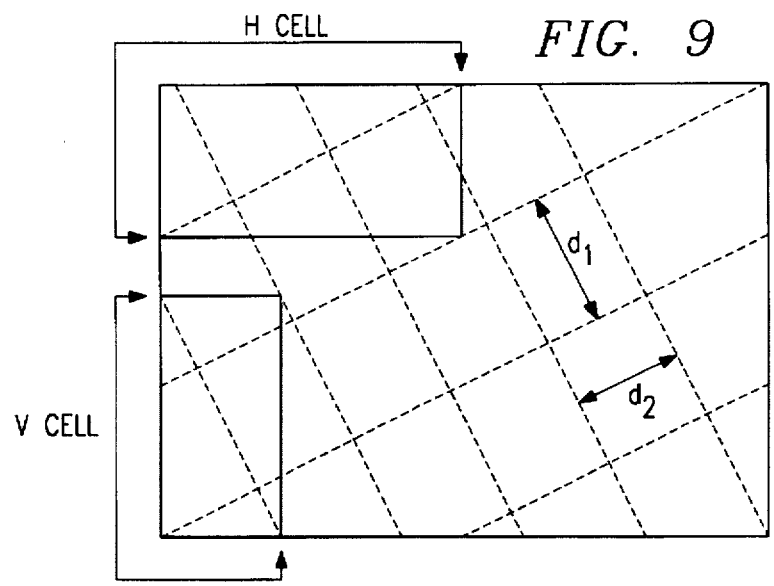

FIG. 9 illustrates a third screening pattern. Both FIGS. 3 and 8 illustrate screening patterns in which the distance between the lines of one set is the same as the distance between lines of the other set. However, in FIG. 9, the lines of the horizontal cells have one frequency, and the lines of the vertical cells have another. In other words, $d_1$ is not the same as $d_2$. However, the cells corresponding to either set of lines have a repeating pattern.

Figure 10:
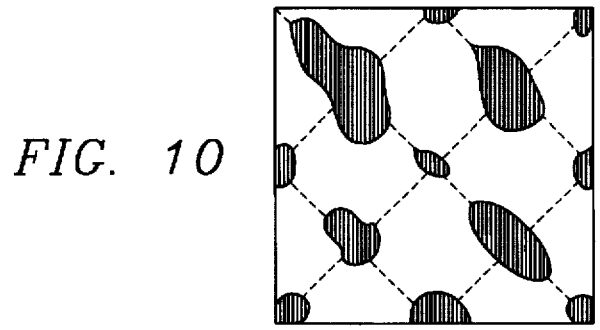
FIG. 10 illustrates the results of two-dimensional halftone printing.

FIG. 10 illustrates the results of two-dimensional screening in accordance with the invention. The two diagonal line screens are shown as dotted lines. The screening pattern is similar to that of FIG. 8. The image has its exposures concentrated in smaller areas for a given greyscale level, as compared to one-dimensional screening.

Figure 11:
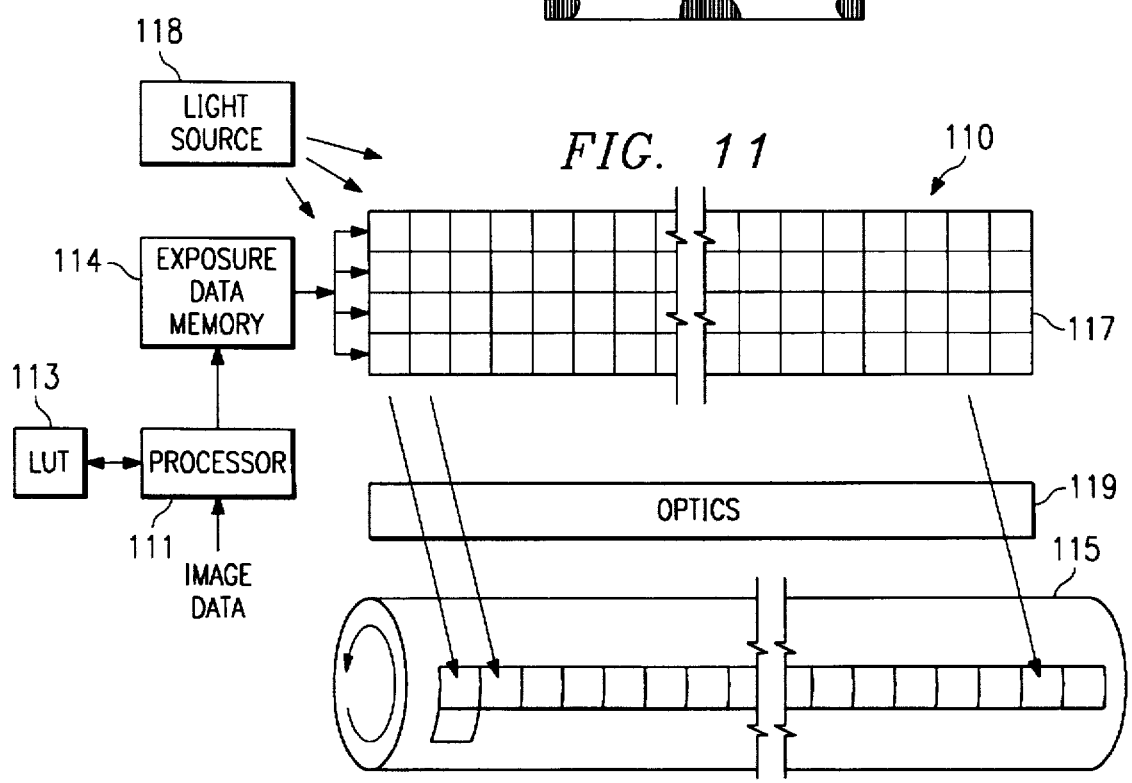
FIG. 11 illustrates a printer system having a processor programmed in accordance with the invention and a memory for storing tone curve data.

FIG. 11 illustrates a printing system 110 having a processor 111 programmed to implement the method of the invention. In FIG. 11, the drum 115 is exposed with a spatial light modulator (SLM) 117 having an array of pixels. The pixels of the SLM 117 are used to expose pixels on the drum 115.

Processor 111 receives greyscale values for pixels of the image to be printed. Processor 111 is programmed to determine, for each pixel, a classification from that pixel's horizontal cell and a classification from that pixel's vertical cell. The tone curves can be implemented as look-up tables 113, using conventional memory devices memory devices and methods. Processor 111 accesses look-up tables 113 to convert the input pixel values to output pixel values, depending on the pixel's classifications. As described above, the result is two values for each pixel, which processor 111 multiplies or otherwise combines, to obtain a greyscale value for each pixel. These values may directly represent exposure values, or some other process may be used to obtain exposure values. U.S. patent Ser. No. 08/038,398, entitled "Grayscale Printing Using Spatial Light Modulators", assigned to Texas Instruments Incorporated and incorporated herein by reference, describes various methods for exposing a drum with a digital micro-mirror device, a type of SLM 117. The exposure values are stored in an exposure data memory in a format appropriate for delivery to the SLM 117. The SLM 117 is illuminated by a light source 118, and appropriate optics 119 are used to transfer the SLM image to the drum 115.

Other Embodiments

Although the present invention and its advantages have been described in detail, it should be understood that various changes, substitutions and alterations can be made herein without departing from the spirit and scope of the invention as defined by the appended claims.

What is claimed is:

1. A method of generating greyscale values to be used for printing an image comprised of a number of pixels each having an input value, comprising the steps of:

line-screening said image with a number of lines in one direction and a number of lines in a substantially orthogonal direction, by dividing said image into a number of horizontal cells each containing the same number of said pixels and having a repeating pattern of a portion of one or more of said lines in said one direction, and by dividing said image into a number of vertical cells each containing the same number of said pixels and having a repeating pattern of a portion of one or more of said lines in said substantially orthogonal direction;

for each said pixel, classifying said pixel in accordance with its distance from the nearest of said lines in its associated horizontal cell, thereby obtaining a horizontal cell classification, and then mapping said horizontal cell classification to said pixel's input value to a first output value;

for each said pixel, classifying said pixel in accordance with its distance from the nearest of said lines in its associated vertical cell, thereby obtaining a vertical cell classification, and then mapping said vertical cell classification to said pixel's input value to a second output value; and combining said first output value and said second output value of each said pixel to determine a greyscale value for each said pixel.

2. The method of claim 1, wherein said line-screening step is performed such that said lines are diagonal with respect to said image.

3. The method of claim 1, wherein said horizontal cells have a same size and shape as said vertical cells, rotated 90 degrees.

4. The method of claim 1, wherein said lines in said one direction have a same spacing as said lines in said substantially orthogonal direction.

5. The method of claim 1, wherein said horizontal cells have borders contiguous with those of said vertical cells.

6. The method of claim 1, wherein said mapping steps result in same values for pixels in said horizonal cells and said vertical cells having same classification.

7. The method of claim 1, wherein said combining step is performed by averaging said first output value and said second output value.

8. The method of claim 1, wherein said combining step is performed by multiplying said first output value and said second output value.

9. An exposure system for generating greyscale values to be used for printing an image comprised of a number of pixels each having an input value, comprising:

a processor programmed to line-screen said image with a number of lines in one direction and a number of lines in a substantially orthogonal direction, by dividing said image into a number of horizontal cells each containing the same number of said pixels and having a repeating pattern of a portion of one or more of said lines in said one direction, and by dividing said image into a number of vertical cells each containing the same number of said pixels and having a repeating pattern of a portion of one or more of said lines in said substantially orthogonal direction;

said processor further programmed to classify each said pixel in accordance with its distance from the nearest of said lines in its associated horizontal cell, thereby obtaining a horizontal cell classification, and then mapping said horizontal cell classification to said pixel's input value to a first output value;

said processor further programmed to classify each said pixel in accordance with its distance from the nearest of said lines in its associated vertical cell, thereby obtaining a vertical cell classification, and then mapping said vertical cell classification to said pixel's input value to a second output value;

said processor further programmed to combine said first output value and said second output value of each said pixel to determine a greyscale value for each said pixel; and a memory, in data communication with said processor, for storing data for use by said processor.

10. The exposure system of claim 9, further comprising a spatial light modulator for receiving said greyscale data.

11. The exposure system of claim 10, wherein said spatial light modulator is a digital micro-mirror device.

* * * * *

UNITED STATES PATENT AND TRADEMARK OFFICE
CERTIFICATE OF CORRECTION

PATENT NO : 5,786,843
DATED : 7/28/98
INVENTOR(S): Vadlamannati Venkateswar

It is certified that error appears in the above-identified patent and that said Letters Patent is hereby corrected as shown below:

Please add Assignee on Cover Page, Column 1,

-- Assignee: Texas Instruments Incorporated,
           Dallas, Texas --

Signed and Sealed this

Ninth Day of March, 1999

Attest:

Q. TODD DICKINSON

Attesting Officer

Acting Commissioner of Patents and Trademarks